US010927768B2

(12) United States Patent
Cigal et al.

(10) Patent No.: US 10,927,768 B2
(45) Date of Patent: Feb. 23, 2021

(54) SPLINE RING FOR A FAN DRIVE GEAR FLEXIBLE SUPPORT

(71) Applicant: United Technologies Corporation, Farmington, CT (US)

(72) Inventors: Brian P. Cigal, Windsor, CT (US); John R. Otto, Middletown, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 201 days.

(21) Appl. No.: 16/148,227

(22) Filed: Oct. 1, 2018

(65) Prior Publication Data
US 2019/0032571 A1 Jan. 31, 2019

Related U.S. Application Data

(62) Division of application No. 14/893,103, filed as application No. PCT/US2014/039081 on May 22, 2014, now Pat. No. 10,087,848.
(Continued)

(51) Int. Cl.
F02C 7/00 (2006.01)
F02C 7/36 (2006.01)
F01D 25/16 (2006.01)
F02C 3/107 (2006.01)
F16H 57/02 (2012.01)
(Continued)

(52) U.S. Cl.
CPC .............. F02C 7/36 (2013.01); F01D 25/164 (2013.01); F02C 3/107 (2013.01); F02K 3/04 (2013.01); F16H 57/02 (2013.01); F16H 57/025 (2013.01); F05D 2230/60 (2013.01); F05D 2260/30 (2013.01); F05D 2260/36 (2013.01); F05D 2260/40 (2013.01); F05D 2260/40311 (2013.01)

(58) Field of Classification Search
CPC .... F02C 7/36; F02C 3/107; F02K 3/04; F16H 57/02; F16H 57/025; F05D 2260/40; F05D 2260/36; F05D 2230/60; F05D 2230/64; F01D 5/026; F16D 3/843; F16B 2200/503; F16B 2200/506; Y10T 403/7026; Y10T 403/7035
See application file for complete search history.

(56) References Cited

U.S. PATENT DOCUMENTS 5,433,674 A * 7/1995 Sheridan ............... F16H 1/2809
475/346
7,955,046 B2 6/2011 McCune et al.
(Continued)

FOREIGN PATENT DOCUMENTS

GB 612709 11/1948

OTHER PUBLICATIONS

Extended European Search Report for EP Application No. 14836013.4 dated Jun. 2, 2016.
(Continued)

Primary Examiner — Todd E Manahan
Assistant Examiner — Edwin Kang
(74) Attorney, Agent, or Firm — Carlson, Gaskey & Olds, P.C.

(57) ABSTRACT

A gear assembly support for a gas turbine engine includes a spline ring configured to fit into a case of the gas turbine engine and a flex support. The flex support includes splines for engaging the spline ring and an inner portion attachable to a portion the gear assembly.

15 Claims, 4 Drawing Sheets

Related U.S. Application Data

(60) Provisional application No. 61/831,718, filed on Jun. 6, 2013.

(51) Int. Cl.
  *F02K 3/04* (2006.01)
  *F16H 57/025* (2012.01)

(56) References Cited

U.S. PATENT DOCUMENTS

| | | | |
|---|---|---|---|
| 8,297,916 B1 | 10/2012 | McCune et al. | |
| 8,297,917 B1 | 10/2012 | McCune et al. | |
| 8,333,678 B2 | 12/2012 | McCune | |
| 2003/0139216 A1* | 7/2003 | Zilberman | F16D 3/68 |
| | | | 464/94 |
| 2003/0162630 A1* | 8/2003 | Poulin | F16H 57/082 |
| | | | 475/331 |
| 2008/0095628 A1 | 4/2008 | Suciu et al. | |
| 2009/0263181 A1* | 10/2009 | Kozlowski | F16D 1/076 |
| | | | 403/77 |
| 2010/0105516 A1* | 4/2010 | Sheridan | F01D 25/18 |
| | | | 475/346 |
| 2011/0130246 A1 | 6/2011 | McCune et al. | |
| 2011/0286836 A1 | 11/2011 | Davis | |
| 2012/0260669 A1* | 10/2012 | Davis | F02C 7/06 |
| | | | 60/797 |
| 2012/0263579 A1 | 10/2012 | Otto et al. | |
| 2014/0196471 A1 | 7/2014 | Otto et al. | |

OTHER PUBLICATIONS

International Preliminary Report on Patentability for International Application No. PCT/US2014/039081 dated Dec. 17, 2015.

International Search Report and Written Opinion for International Application No. PCT/US2014/039081 dated Mar. 30, 2015.

European Search Report for European Application No. 19202092.3 dated Dec. 19, 2019.

\* cited by examiner

SPLINE RING FOR A FAN DRIVE GEAR FLEXIBLE SUPPORT

CROSS-REFERENCE TO RELATED APPLICATIONS

This application is a divisional of U.S. patent application Ser. No. 14/893,103 filed on Nov. 23, 2015 which is a U.S. National Phase of International Application No. PCT/US2014/039081 filed on May 22, 2014, which claims benefit of U.S. Provisional Application No. 61/831,718 filed on Jun. 6, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The gear assembly is attached to a static structure through a flexible support. The flexible support orientates the gear assembly within the engine and also accommodates generated torque during operation. The flexible support further includes a torque transfer feature that mates with corresponding features within engine static structure. Fabrication of any features within the engine static structure can be costly and time consuming.

Accordingly, engine manufacturers continue to seek improvements in the support structure that balance the functional requirements against cost and weight.

SUMMARY

A gear assembly support for a gas turbine engine according to an exemplary embodiment of this disclosure, among other possible things includes a spline ring configured to fit into a case of the gas turbine engine, and a flex support including splines for engaging the spline ring and an inner portion attachable to a portion the gear assembly.

In a further embodiment of the foregoing gear assembly support, the flex support includes a plurality of attachment flanges extending radially outward and the spline ring includes openings for receiving fasteners extending through the attachment flanges for securing both the flex support and the spline ring to the case.

In a further embodiment of any of the foregoing gear assembly supports, the flex support and the spline ring are secured independently to the case of the gas turbine engine.

In a further embodiment of any of the foregoing gear assembly supports, the spline ring includes an interference fit with an inner surface of the case.

In a further embodiment of any of the foregoing gear assembly supports, the spline ring includes an aft edge received within an annular slot defined within the case.

In a further embodiment of any of the foregoing gear assembly supports, the flex support includes a snap portion defining an interference fit with the case.

In a further embodiment of any of the foregoing gear assembly supports, the snap portion includes an outer diameter defining the interference fit within the case and a thickness between an undercut and the outer diameter for adjusting the interference fit.

In a further embodiment of any of the foregoing gear assembly supports, includes a torque reacting portion for transferring torque from the gear assembly to the case independent of the snap portion.

A turbofan engine according to an exemplary embodiment of this disclosure, among other possible things includes a fan including a plurality of fan blades rotatable about an engine axis, a turbine section, a geared architecture driven by the turbine section for rotating the fan about the engine axis, a static case structure disposed about the geared architecture, a spline ring configured to fit into the case, and a flex support including splines for engaging the spline ring and an inner portion attachable to the gear assembly.

In a further embodiment of the foregoing turbofan engine, the flex support includes a plurality of attachment flanges extending radially outward and the spline ring includes openings for receiving fasteners extending through the attachment flanges for securing both the flex support and the spline ring to the case.

In a further embodiment of any of the foregoing turbofan engines, the spline ring includes an interference fit with an inner surface of the case.

In a further embodiment of any of the foregoing turbofan engines, the spline ring includes an aft edge received within an annular slot defined within the case.

In a further embodiment of any of the foregoing turbofan engines, the flex support includes a snap portion defining an interference fit with the case.

In a further embodiment of any of the foregoing turbofan engines, the snap portion includes an outer diameter defining the interference fit within the case and a thickness between an undercut and the outer diameter for adjusting the interference fit.

In a further embodiment of any of the foregoing turbofan engines, includes a torque reacting portion for transferring torque from the gear assembly to the case independent of the snap portion.

A method of supporting a gear assembly within a gas turbine engine according to an exemplary embodiment of this disclosure, among other possible things includes assembling a spline ring into a case of the gas turbine engine, assembling a flex support into the case such that a spline disposed on the flex support engages the spline ring mounted within the case, and attaching the gear assembly to the flex support.

In a further embodiment of the foregoing method, includes forming an inner surface of the case to include a channel for receiving a portion of the spline ring and assembling the spline ring into the channel.

In a further embodiment of any of the foregoing methods, includes forming openings for receiving fasteners within the case and extending fasteners through the flex support and the spline ring and into the openings for securing the spline ring and flex support to the case.

In a further embodiment of any of the foregoing methods, includes defining an interference fit between an inner surface of the case and the flex support and assembling the flex support into the case such that a portion of the flex support engages the case in an interference fit.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
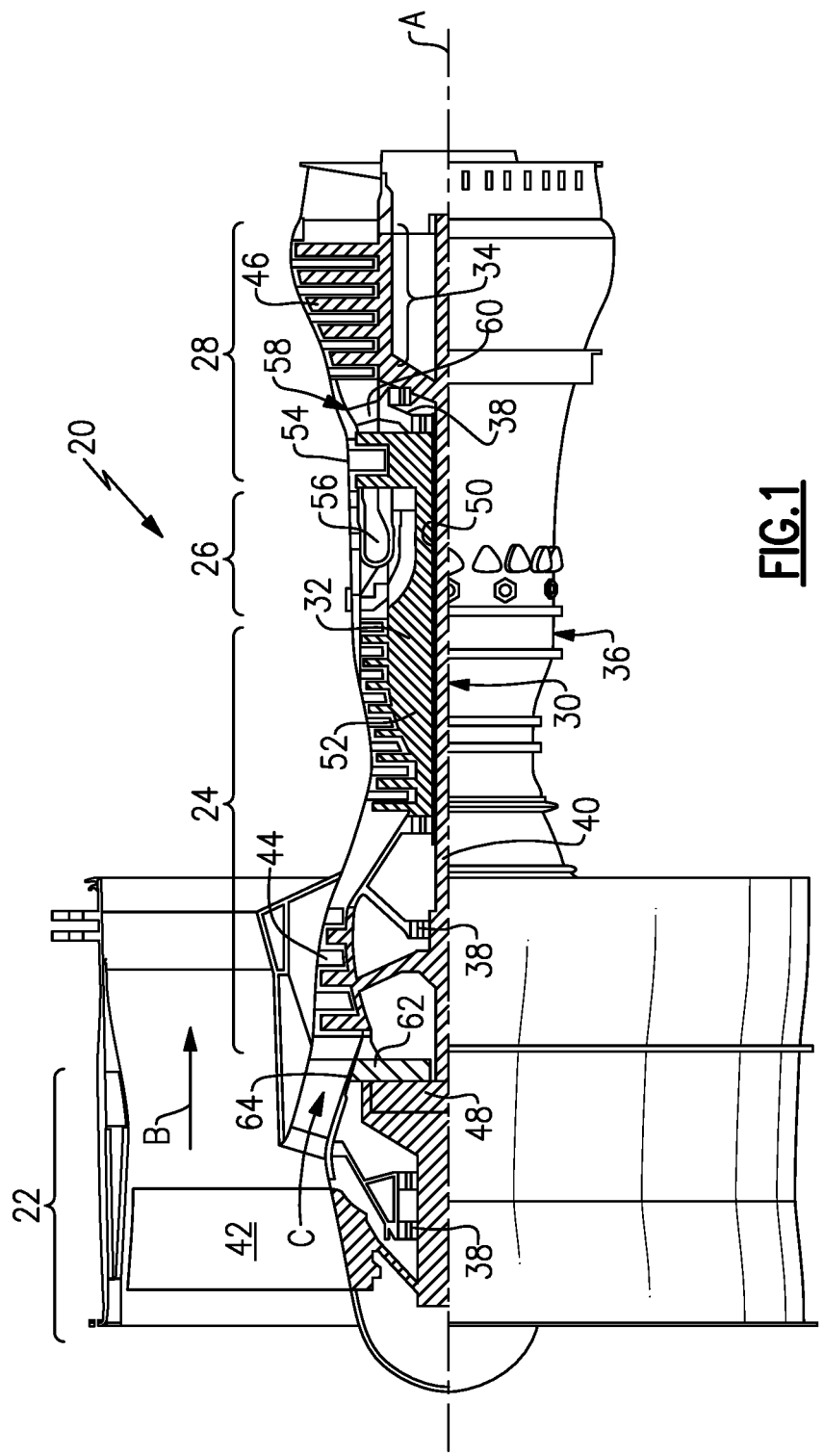
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(\text{Tram} \degree \text{R})/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A support member referred to in this disclosure as a flex support 62 is provided to mount the geared architecture 48 to a static structure or case 64 of the gas turbine engine 20. The flex support 62 supports the geared architecture 48 in a manner that provides flexibility to compensate for operational torque.

Figure 2:
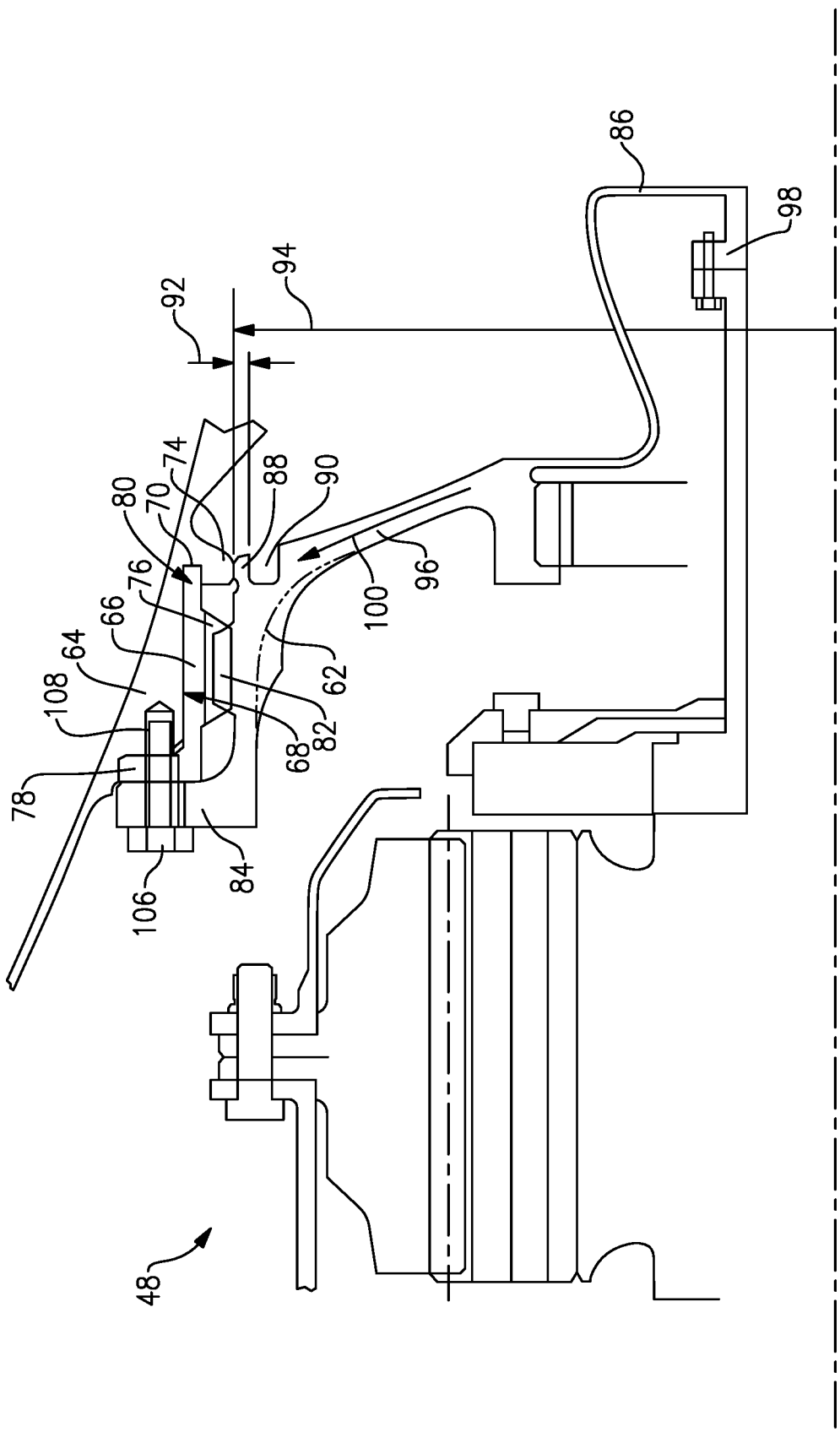
FIG. 2 is a sectional view of an example spline ring and flex support for a geared architecture.
Figure 4:
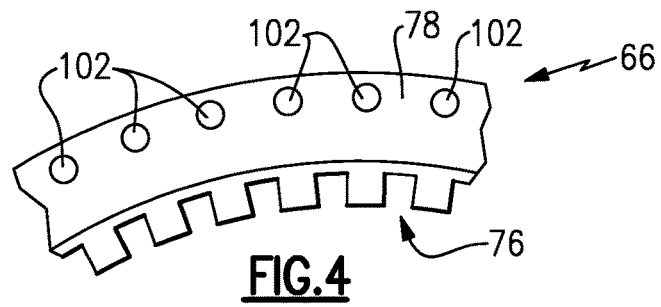
FIG. 4 is a partial forward side of the spline ring.

Referring to FIGS. 2 and 4 with continued reference to FIG. 1, the example flex support 62 is fit within the case 64. A spline ring 66 is supported within the case 64 and includes splines 76 that engage splines 82 of the flex support 62. Torque schematically indicated by arrow 100 generated by the geared architecture 48 is grounded to the case 64 through engagement of splines 76 and 82.

The case 64 includes an inner surface 68 within which the spline ring 66 fits. The interface between the spline ring 66 is a light interference fit to provide a desired location relative to the case 64. The case 64 includes an aft annular slot 70 that receives an aft edge 80 of the spline ring 66. The spline ring 66 is thereby assembled into the case 64 with a light interference fit against inner surface 68 and with the aft edge 80 received within the annular slot 70. The spline ring 66 includes a forward flange 78 that abuts a surface of the case 64. The surface of the case 64 adjacent the forward flange 78 includes openings 108 for receiving fasteners 106.

Figure 3:
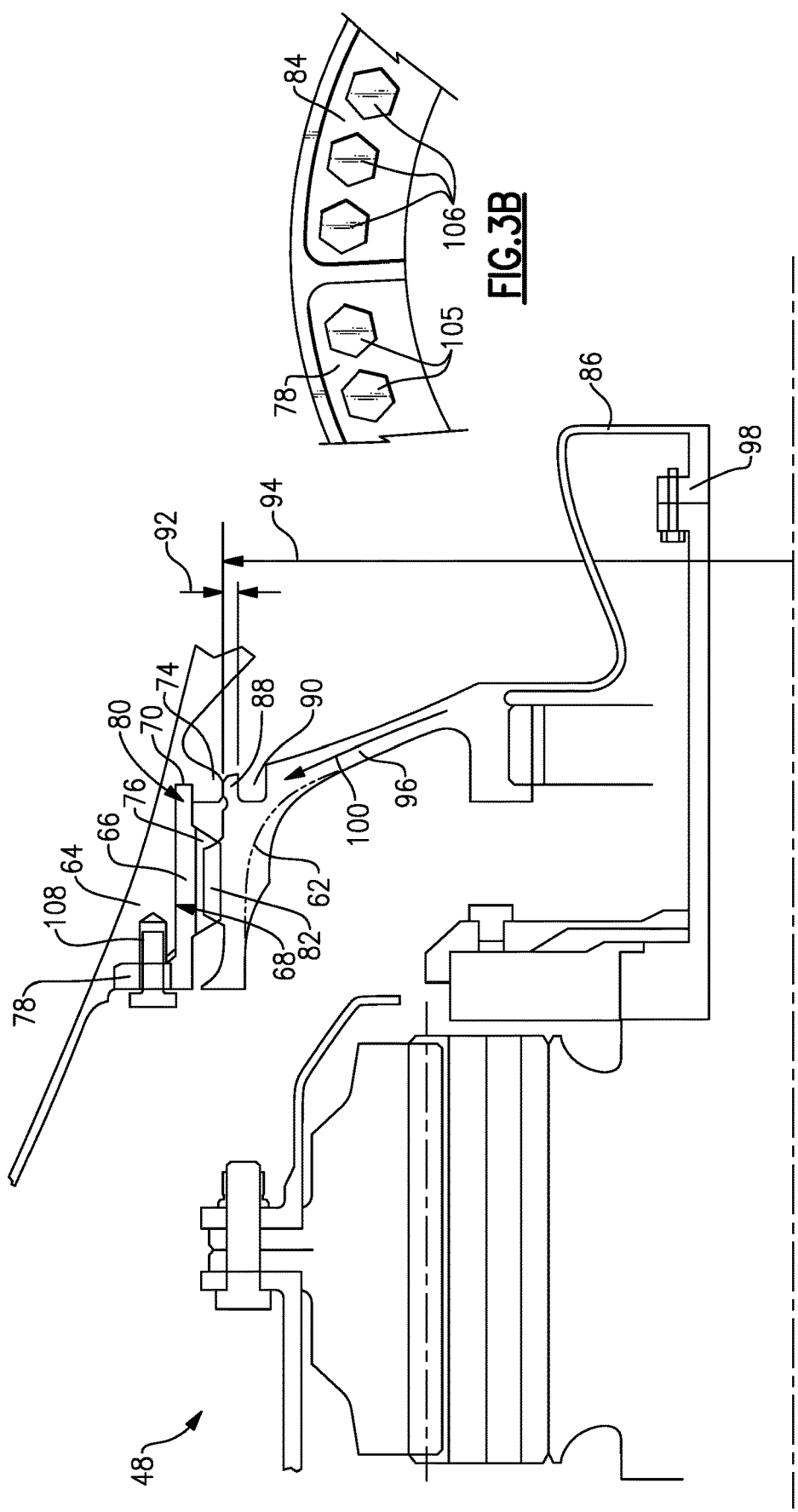
FIG. 3A is a sectional view of another example spline ring and flex support for a geared architecture.
FIG. 3B is a schematic view of the spline ring and flex support shown in FIG. 3A.

Referring to FIGS. 3A and 3B, in another example, the spline ring 66 and flex support 62 are individually and separately attached to the engine case 64. In this example, the forward flange 78 and the flex support flange 84 are interspersed and attached to the case 64. The forward flange 78 is attached with fasteners 105 and the flex support flange 84 is secured to the engine case with the fasteners 106.

Figure 5:
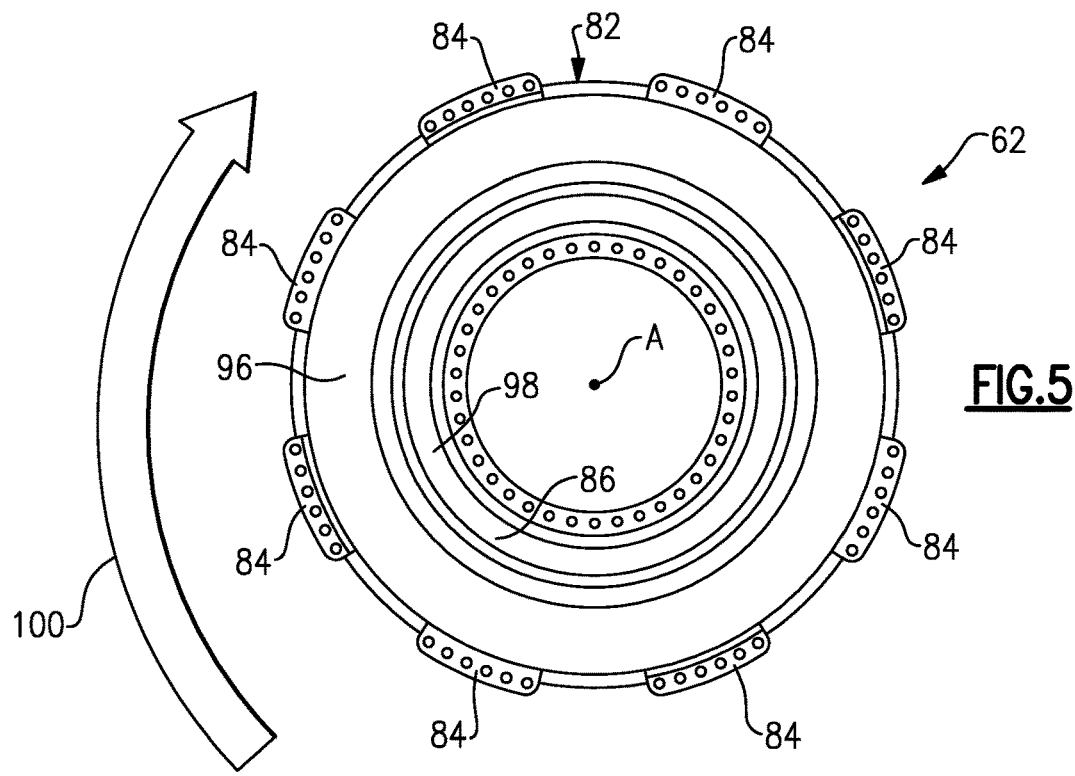
FIG. 5 is a front view of the example flex support.
Figure 6:
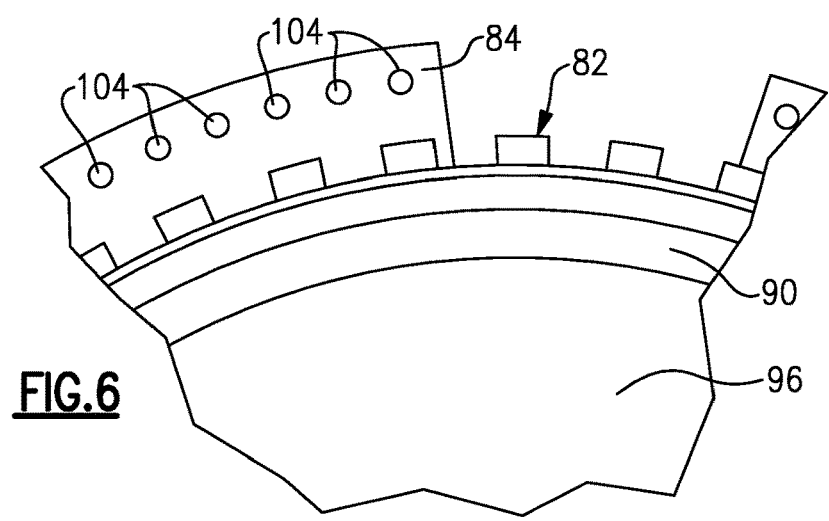
FIG. 6 is an aft view of the example flex support.

Referring to FIGS. 5 and 6 with continued reference to FIGS. 2 and 4, the flex support 62 includes the splines 82 that engage the splines 76 of the spline ring 66. The geared architecture 48 is attached to an inner flange 98 of a flex portion 86. Torque from the geared architecture 48 is transferred through a torque portion 96 disposed between the flex portion 86 and the spline 82.

The flex support 62 includes an annular tab 88 aft of the spline 82 that fits against an annular ring 74 defined within the case 64. A fit between the tab 88 and the annular ring 74 is an interference fit. The interference fit between the tab 88 and the annular ring 74 of the case orientates the flex support 62 relative to the case 64.

An undercut 90 is provided proximate the tab 88 for adjusting the interference fit. A thickness 92 between an outer diameter 94 at the tab 88 and the undercut 90 provides for tailoring of the interference fit between the flex support 62 and the case 64 to provide a desired fit.

The flex support includes flanges 84 that extend forward and are attached to a portion of the case 64 with fasteners 106 that extend through the spline ring 66. The flanges 84 abut the flanges 78 of the spline ring 66. The spline ring 66 includes openings 102 that align with openings 104 in the flex support 62. Fasteners 106 extend through the aligned openings 104 and 102 and into the openings 108 defined within the case 64. The fasteners 106 therefore secure both the spline ring 66 and the flex support 62 to the case 64. A portion of torque 100 may also be grounded to the case 64 through the fasteners 106.

The spline ring 66 simplifies assembly and manufacturing by eliminating machining of complex geometries on an inner surface of the case 64. The spline ring 66 provides the desired torque grounding to the case 64 from the flex support 62 while eliminating costly and complex machining operations.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gear assembly support for a gas turbine engine comprising:
   a spline ring configured to fit into a case of the gas turbine engine, the spline ring including a plurality of forward flanges spaced circumferentially apart; and
   a flex support including splines for engaging the spline ring, an inner portion attachable to a portion of the gear assembly, and a plurality of support flanges spaced circumferentially apart, wherein the plurality of forward flanges are interspersed between the plurality of support flanges of the flex support within a common plane transverse to an engine longitudinal axis of the gas turbine engine and secured independently from the spline ring to the case of the gas turbine engine.

2. The gear assembly support as recited in claim 1, wherein the spline ring comprises an interference fit with an inner surface of the case.

3. The gear assembly support as recited in claim 1, wherein the spline ring includes an aft edge received within an annular slot defined within the case.

4. The gear assembly support as recited in claim 1, wherein the flex support includes a snap portion defining an interference fit with the case.

5. The gear assembly support as recited in claim 4, wherein the snap portion comprises an outer diameter defining the interference fit within the case and a thickness between an undercut and the outer diameter for adjusting the interference fit.

6. The gear assembly support as recited in claim 5, wherein the spline ring includes a torque portion for transferring torque from the gear assembly to the case independent of the snap portion.

7. A turbofan engine comprising:
   a fan including a plurality of fan blades rotatable about an engine axis;
   a turbine section;
   a geared architecture driven by the turbine section for rotating the fan about the engine axis;
   a static case structure disposed about the geared architecture;
   a spline ring configured to fit into the static case structure, the spline ring including a plurality of forward flanges spaced circumferentially apart that are secured with a first plurality of fasteners to the static case structure; and
   a flex support including splines for engaging the spline ring, an inner portion attachable to the geared architecture, and a plurality of support flanges spaced circumferentially apart, wherein the flex support is secured with a second plurality of fasteners through the plurality of support flanges to the static case structure independent of the spline ring, wherein the plurality of forward flanges are interspersed with the plurality of support flanges within a common plane transverse to the engine axis.

8. The turbofan engine as recited in claim 7, wherein the spline ring comprises an interference fit with an inner surface of the static case structure.

9. The turbofan engine as recited in claim 7, wherein the spline ring includes an aft edge received within an annular slot defined within the static case structure.

10. The turbofan engine as recited in claim 7, the flex support includes a snap portion defining an interference fit with the static case structure.

11. The turbofan engine as recited in claim 10, wherein the snap portion comprises an outer diameter defining the interference fit within the static case structure and a thickness between an undercut and the outer diameter for adjusting the interference fit.

12. The turbofan engine as recited in claim 11, the spline ring includes a torque portion for transferring torque from the gear assembly to the static case structure independent of the snap portion.

13. A method of supporting a gear assembly within a gas turbine engine comprising:
   assembling a spline ring into a case of the gas turbine engine including securing a plurality of circumferentially spaced apart forward flanges of the spline ring to the case with a first plurality of fasteners;
   assembling a flex support into the case such that a spline disposed on the flex support engages the spline ring mounted within the case, wherein the flex support is secured to the case structure with a second plurality of fasteners that extend through a plurality of support flanges of the flex support that are interspersed within circumferential spaces between the plurality of circumferentially spaced apart forward flanges such that the flex support is attached to the case structure independent of the plurality of circumferentially spaced apart forward flanges of the spline ring; and
   attaching the gear assembly to the flex support.

14. The method as recited in claim 13, further including the step of forming an inner surface of the case to include a channel for receiving a portion of the spline ring and assembling the spline ring into the channel.

15. The method as recited in claim 13, further including the step of defining an interference fit between an inner surface of the case and the flex support and assembling the flex support into the case such that a portion of the flex support engages the case according to the interference fit.

\* \* \* \* \*